Patented July 21, 1931

1,815,812

UNITED STATES PATENT OFFICE

WILLIAM CHITTENDEN TAYLOR, OF CORNING, NEW YORK, ASSIGNOR TO CORNING GLASS WORKS, OF CORNING, NEW YORK, A CORPORATION OF NEW YORK

GLASS

No Drawing.   Application filed May 11, 1926. Serial No. 108,415.

The glass designated as B—2 of the Sullivan & Taylor Patent No. 1,304,623, is a glass of great value in radio work, its power loss at radio frequencies being low. Glass A of my prior Patent No. 1,192,474 is also a good radio glass, its power factor being decidedly less than the glass first mentioned. An investigation of glasses of this B type has led me to the conclusion that contrary to the previous opinion the power factor losses in radio glasses are decreased as silica is replaced therein by boric oxide, when this is done without unduly increasing the alkali content, and that boric oxide is a valuable constituent for radio glasses.

I have further discovered that with any given percentage of silica, boric oxide and alkali, marked advantages in power factors for radio frequencies are obtained by using as the alkali proper proportions of potash, soda and lithia. In the following table I have under the heading M given the average of a number of analyses of a glass melted to produce that which is designated as the glass B—2 of the Sullivan & Taylor patent, while under headings N and O I give two glasses which I have melted. These latter illustrate the advantageous results obtained by proper selection of the alkali:

|  | M | N | O |
|---|---|---|---|
| $SiO_2$ | 80.75 | 78.00 | 80.11 |
| $Na_2O$ | 4.10 | 3.00 | 1.97 |
| $K_2O$ | .10 | 1.00 | 2.6 |
| $Li_2O$ |  | .4 | .68 |
| $B_2O_3$ | 12.10 | 14.00 | 13.04 |
| $Al_2O_3$ | 2.00 | 3.00 | 2.35 |
| $CaO$ | .30 |  |  |

It will be noted that in glass N the alkali content is two-tenths of one percent greater than in M and in glass O is five-hundredths of one percent greater than in M, in both of the last named cases the alkali consisting of soda, potash and lithia. While the glass N has somewhat lower silica content than M, the difference existing between O and M in this respect is not as great as that existing between N and M.

At a frequency of 500,000 cycles per second it has been found that the product obtained by multiplying the dielectric constant of each glass by the phase angle difference of that glass (which product fairly represents the relative power loss at the frequency stated) is in the neighborhood of 1.15 for the old glass M and the neighborhood of .50 for the new glasses N and O, this amounting to a reduction of more than 50%. From a comparison of the formulas above given it will be noted that while glass N, under the general rule first above stated, should have a lower power factor than glass O, due to the increase of boric oxide in respect to the silica content, this advantage for N has been overcome by a more correct proportion of the alkalies present in glass O. The changes made in N and O have further resulted in a decrease of the hardness of these glasses as compared with that of M, and hence an increase in their ease of melting and working.

Glass B—2 of the prior Sullivan & Taylor patent and glass A of my prior patent, as well as glasses N and O above given, are suitable for manufacture by ordinary pressing operations into radio insulators of standard forms, such as antenna insulators, pillor insulators, and insulators for wired-wireless lines. For such fabrication it is necessary that the glass have good working properties, including that of forming a smooth non-absorbent skin, and when exposed to the weather, of having good stability. The properties just stated are, of course, those which are common to insulators of various kinds, but a radio insulator must possess not only these properties, but also the peculiar property of small power loss at high frequency.

Generally speaking, I have found that to combine these various qualities, a non-lead glass such as this application is directed to, should have less than 82% of silica, (and preferably over 70% in those containing alkali), and a relatively low alkali content, not exceeding 5%, a part of which should preferably be in the form of lithia and/or potash, or a mixture of the three alkalies, lithia, soda and potash. The glass should contain over 10%, and not more than 30% boric oxide.

As silica itself has no beneficial properties in affecting power factor it is within the scope of this invention to reduce the silica to any desired amount, or even to entirely eliminate it, replacing it in part, at least, by boric oxide and other glass ingredients other than the alkalies. Obviously also as the alkalies themselves have no beneficial properties in affecting power factors, they may be reduced or eliminated if the batch ingredients are such as to form a workable glass without their aid.

"By high frequency" in the following claims, I mean frequencies of 10,000 or more per second.

Having thus described my invention what I claim and desire to secure by Letters Patent is:—

1. In a system carrying radio frequency currents, the combination with a part charged with such currents, of an insulator therefor composed of a non-lead glass containing approximately 80% of silica, 4% of alkalies and 13% of boric oxide, the alkalies being lithia, soda and potash.

2. In a system carrying radio frequency currents, the combination with a part charged with such currents, of an insulator therefor composed of non-lead glass containing between 70% and 82% of silica, about 4% of alkalies, and over 12% of boric oxide, the alkalies being in the form of soda, potash and lithia.

3. In a system carrying radio frequency currents, the combination with a part charged with such currents, of an insulator therefor composed of a glass containing approximately 80% of silica, 4% of alkalies and 13% of boric oxide, the alkalies being lithia, soda and potash.

4. In a system carrying radio frequency currents, the combination with a part charged with such currents, of an insulator therefor composed of glass containing between 70% and 82% of silica, about 4% of alkalies, and over 12% of boric oxide, the alkalies being in the form of soda, potash and lithia.

In testimony whereof I hereunto affix my signature.

WILLIAM CHITTENDEN TAYLOR.